United States Patent
Ishiyama (10) Patent No.: US 6,668,885 B2
(45) Date of Patent: *Dec. 30, 2003

(54) PNEUMATIC TIRE INCLUDING WATER DRAINAGE PASSAGE

(75) Inventor: Makoto Ishiyama, Tokyo (JP)

(73) Assignee: Bridgestone Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/511,982

(22) Filed: Feb. 24, 2000

(65) Prior Publication Data

US 2002/0189734 A1 Dec. 19, 2002

(30) Foreign Application Priority Data

Feb. 25, 1999 (JP) ............................................ 11-048473

(51) Int. Cl.$^7$ ......................... B60C 11/117; B60C 11/12
(52) U.S. Cl. ........................... 152/209.17; 152/209.23; 152/902; 152/DIG. 3
(58) Field of Search ..................... 152/209.17, 209.18, 152/DIG. 3, 902, 209.23

(56) References Cited

U.S. PATENT DOCUMENTS

| | | | | |
|---|---|---|---|---|
| 2,575,439 A | * | 11/1951 | Billingsley | 152/209.17 |
| 3,532,147 A | * | 10/1970 | Gough | 152/209.17 |
| 3,645,313 A | * | 2/1972 | Robert et al. | 152/209.17 |
| 3,848,651 A | * | 11/1974 | French | 152/209.17 |
| 4,979,549 A | * | 12/1990 | Kaneko | 152/209.17 |
| 6,116,310 A | * | 9/2000 | Shinohara | 152/DIG. 3 |

FOREIGN PATENT DOCUMENTS

| | | | | |
|---|---|---|---|---|
| EP | 0 625 436 A1 | | 11/1994 | |
| EP | 0 654 366 A1 | | 5/1995 | |
| EP | 820885 | * | 1/1998 | |
| EP | 1 034 946 A1 | | 9/2000 | |
| GB | 507254 | * | 6/1939 | 152/209.17 |
| GB | 2061837 | * | 5/1981 | 152/209.17 |
| JP | 62-241712 | * | 10/1987 | 152/DIG. 3 |
| JP | 2-310108 | * | 12/1990 | 152/DIG. 3 |
| JP | 3-1910 | | 1/1991 | |
| JP | 3-208705 | * | 9/1991 | 152/209.17 |

OTHER PUBLICATIONS

Patent Abstracts of Japan abstracting JP 2000–280715 published Oct. 10, 2000.
Patent Abstracts of Japan abstracting JP 02–310108 published Dec. 25, 1990.

* cited by examiner

Primary Examiner—Steven D. Maki
(74) Attorney, Agent, or Firm—Sughrue Mion, PLLC (57) ABSTRACT

A pneumatic tire in which a block formed in a tread surface has, in a ground contacting surface thereof, a closed sipe which is formed so as to not open onto a groove. The sipe has a first opening formed in the ground-contacting surface of the block, a second opening formed at side surfaces of the block, and a hole which communicates the first opening and the second opening. In accordance with this structure, water taken-in into the sipe from the first opening at the ground-contacting surface of the block is discharged to the second opening contacting at the side surface facing to the groove. As a result, water drainability of the sipe is improved without lowering rigidity of the block. Thus, a ground contacting performance of the block improves. The pneumatic tire therefore has improved performance on wet roads and improved performance on snowy and icy roads without the rigidity of blocks decreasing.

19 Claims, 8 Drawing Sheets

PNEUMATIC TIRE INCLUDING WATER DRAINAGE PASSAGE

BACKGROUND OF THE INVENTION

1. Field of the Invention

The present invention relates to a pneumatic tire which aims for an improvement in performances on wet roads and in performances on snowy and icy roads.

2. Description of the Related Art

Pneumatic tires are conventionally provided with sipes in the surfaces of blocks formed on the tread surface. Such tires aim to improve driving performances/braking performances and directional stability on wet road surfaces and snowy and icy road surfaces by increasing the edge effect so as to improve the water drainability.

However, when a large number of sipes which are opened onto the both side surfaces are provided in a block, the problem arises that the rigidity of the block decreases to deteriorate directional stability. Closed sipes, neither of whose ends opens onto grooves, are effective in order to ensure the rigidity of the block. But water cannot drain from the end portions of the sipes into grooves, and thus the problem that drainability is inferior arises.

SUMMARY OF THE INVENTION

The present invention was developed in order to overcome the above-described drawbacks, and an object of the present invention is to provide a pneumatic tire which aims for an improvement in performances on wet roads and performances on snowy and icy roads by improving drainability while maintaining block rigidity.

In order to achieve the above object, the present invention has the following aspects.

A first aspect of the present invention is a pneumatic tire comprising: a tread surface having a plurality of grooves formed therein which intersect one another, thereby defining a plurality of land portions that each have a ground contacting surface and side surfaces; and at least one water drainage passage provided in the land portion, wherein the water drainage passage is a hole (a communicating hole) formed inside the land portion, the hole has two ends, one end is opened at the ground contacting surface of the land portion, and the other end is opened at the side surface of the land portion.

In accordance with the first aspect, when water is taken-in into the water drainage passage from the portion which is opened at the ground contacting surface, even if the hole of the opening portion at the ground-contacting surface closes up by deformation of the block-shaped land portion due to the block-shaped land portion contacting the road surface, the water within the water drainage passage (the hole) can be discharged, via the hole, to a groove by the opening end at side surfaces.

Because only the hole, which passes through the interior, is formed as the water drainage passage at the block-shaped land portion, sufficient rigidity of the water drainage passage can be maintained as compared with a block-shaped land portion which is formed with a sipe which is opened at both ends or one end in the contacting surface.

Namely, the drainability of the water drainage passage can be improved without lowering the block rigidity, and the ground contacting ability of the block-shaped land portion can be improved by the improvement in the water drainability. Thus, the performance on wet roads and the performance on snowy and icy roads can be markedly improved.

In a second aspect of the present invention, the water drainage passage is a hole having a circular or oval cross-section.

In accordance with the second aspect, the cross-section of the hole, which communicates from the ground-contacting surface of the block-shaped land portion to side surface thereof, is circular or oval. Thus, a concentration of stress in the hole can be prevented by those rounded cross-sectional shapes. Accordingly, generation of cracks at the hole due to deformation of the block-shaped land portion can be suppressed.

In a third aspect of the present invention, the cross-section of the hole is a thin, elongated configuration having a longitudinal direction and a transverse direction.

In accordance with the third aspect, the opening end of the hole at the ground-contacting surface is a thin, elongated configuration having a longitudinal direction and a transverse direction. Therefore, the longitudinal direction of the opening end becomes an edge component, and contributes to directional stability and braking performance.

In a fourth aspect of the present invention, the hole has a curved portion or a bent portion from the ground-contacting surface toward the side surface.

In accordance with the fourth aspect, by providing a curved portion or a bent portion in the hole, concentration of stress at specific portions can be prevented, and the generation of cracks and the like can be suppressed. The "curved portion" is a portion which is formed in a continuous curve, and the "bent portion" is a portion bent so as to include an obtuse angle.

DESCRIPTION OF THE PREFERRED EMBODIMENTS

A pneumatic tire relating to a first embodiment of the present invention will be described in detail hereinafter. The present first embodiment is described in detail with reference to FIGS. 1 through 4.

Figure 2:
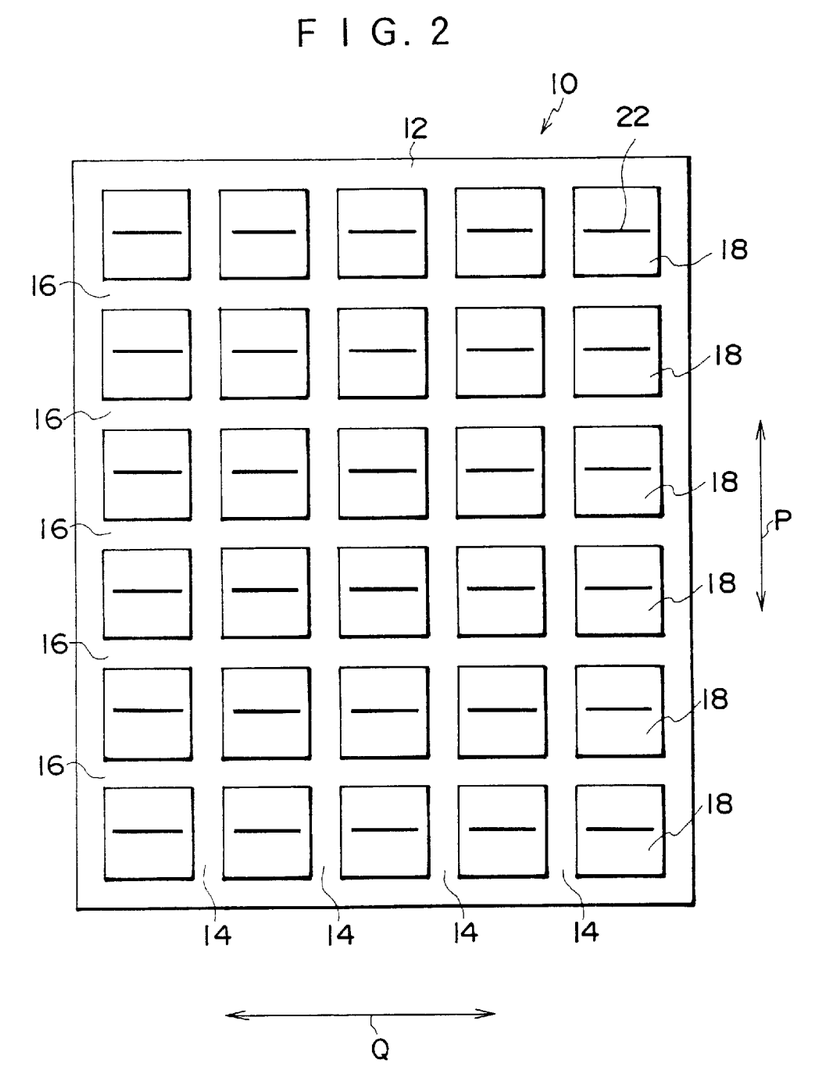
FIG. 2 is a plan view of a tread of a pneumatic tire relating to the first embodiment of the present invention.

As illustrated in FIG. 2, a pneumatic tire 10 comprises a tube-shaped tread 12 which extends across a pair of left and right sidewalls (not illustrated). A plurality of main grooves 14, which are formed along a tire circumferential direction (the direction of arrow P), and a plurality of lug grooves 16, which are formed along the tire transverse direction (the direction of arrow Q), are formed in the tread 12. A plurality of blocks 18 are demarcated by the main grooves 14 and the lug grooves 16. Sipes 22 which extend along the transverse direction of the tire are formed in the blocks 18.

Figure 1:
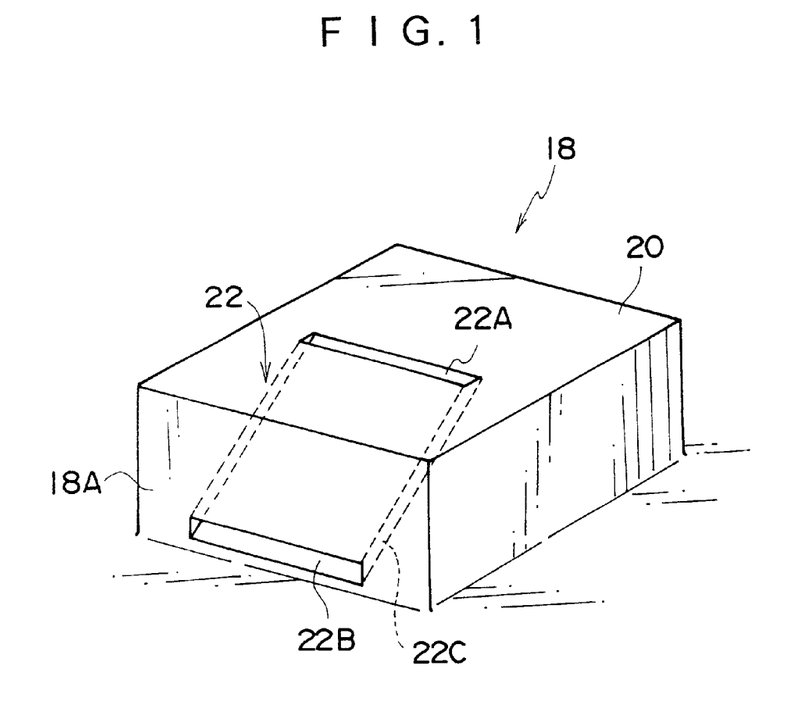
FIG. 1 is a perspective view of a block of a pneumatic tire relating to a first embodiment of the present invention.

As illustrated in FIG. 1, the sipe 22 is formed by an opening 22A (first opening) at a ground contacting surface 20 of the block 18, an opening 22B (second opening) which opens at a side surface 18A of the block 18 which side surface 18A faces a lug groove 16, and a hole 22C which is inclined to the openings 22A and 22B.

Effects of the pneumatic tire 10 structured as described above will be described hereinafter.

The following effects are obtained by the pneumatic tire 10, which has the blocks 18 in which the sipes 22 are formed, when the pneumatic tire 10 is mounted to a vehicle and the vehicle is run on a wet road surface.

Due to the block 18 contacting the road surface, water is taken-in into the communicating hole 22C from the opening 22A of the sipe 22 formed in the ground contacting surface 20. Due to the block 18 deforming or the like, the water is confined in the interior of the sipe 22, but it is possible to discharge the water to the lug groove 16 from the (communicating) hole 22C via the opening 22B. Thus, the drainability to drain the water from the road surface to the side surface is improved, and the ground contact performance of the tread 12 (block 18) is also improved.

Further, the longitudinal direction end portion of the opening 22A of the sipe 22 does not open onto a groove on either side. Therefore, the rigidity of the block 18 can be sufficiently ensured, and the rigidity does not become insufficient due to the provision of the (communicating) hole 22C in the block 18.

Moreover, because the cross-sectional configuration of the communicating hole 22C of the sipe 22 is a thin, elongated shape, the edge component is sufficiently maintained.

As a result, the directional stability of the pneumatic tire on wet road surfaces improves.

The performance of the pneumatic tire 10 of the present invention on wet road surfaces has been described above, and the pneumatic tire 10 also exhibits similar effects on snowy and icy roads.

Figure 3:
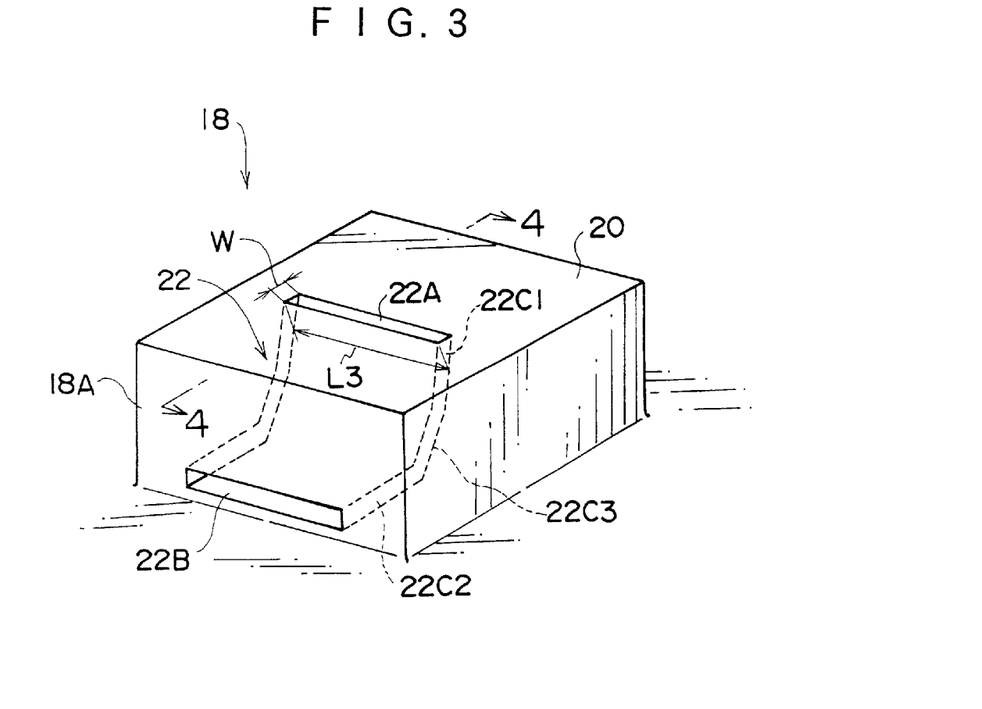
FIG. 3 is a perspective view of a block of a pneumatic tire relating to a modified example of the first embodiment.
Figure 4:
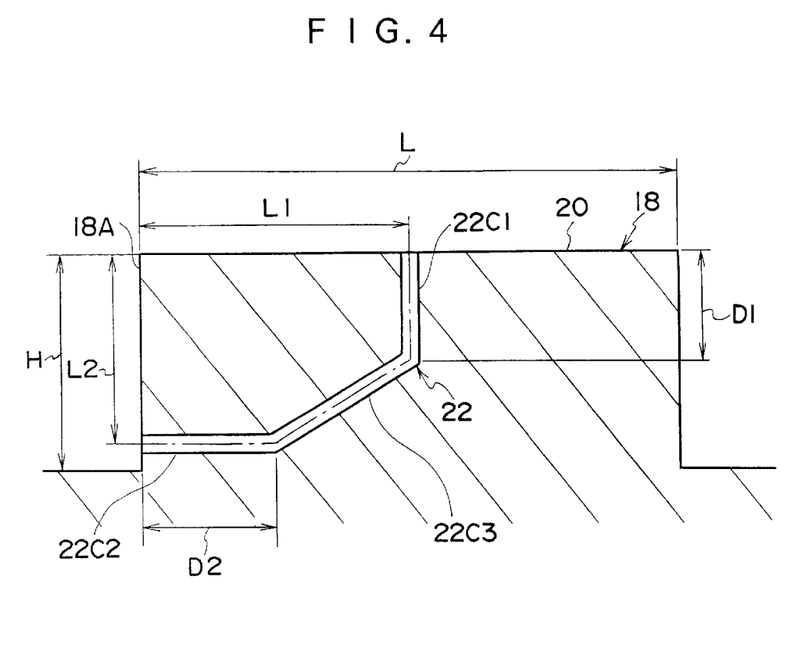
FIG. 4 is a cross-sectional view taken along line 4—4 of FIG. 3.

In the present embodiment, the (communicating) hole 22C of the sipe 22 is inclined. In other examples, the hole may be formed in a curved configuration (a configuration which bends at an obtuse angle). Namely, as illustrated in FIGS. 3 and 4, the hole 22C is formed by a vertical portion 22C1 which is formed vertically from the opening 22A to the ground contacting surface 20, a parallel portion 22C2 which is formed from the opening portion 22B and parallel to the ground contacting surface 20, and a curved portion 22C3 which connects the vertical portion 22C1 and the parallel portion 22C2.

Next, the pneumatic tire 10 relating to a second embodiment, in which the configuration of the sipe 22 is different than in the first embodiment, will be described with reference to FIGS. 5 through 7. Structural elements which are the same as those of the first embodiment are denoted by the same reference numerals, and detailed description thereof is omitted. In the present second embodiment, because only the configuration of the sipe differs from the structure of the first embodiment, only the configuration of the sipe will be explained.

Figure 5:
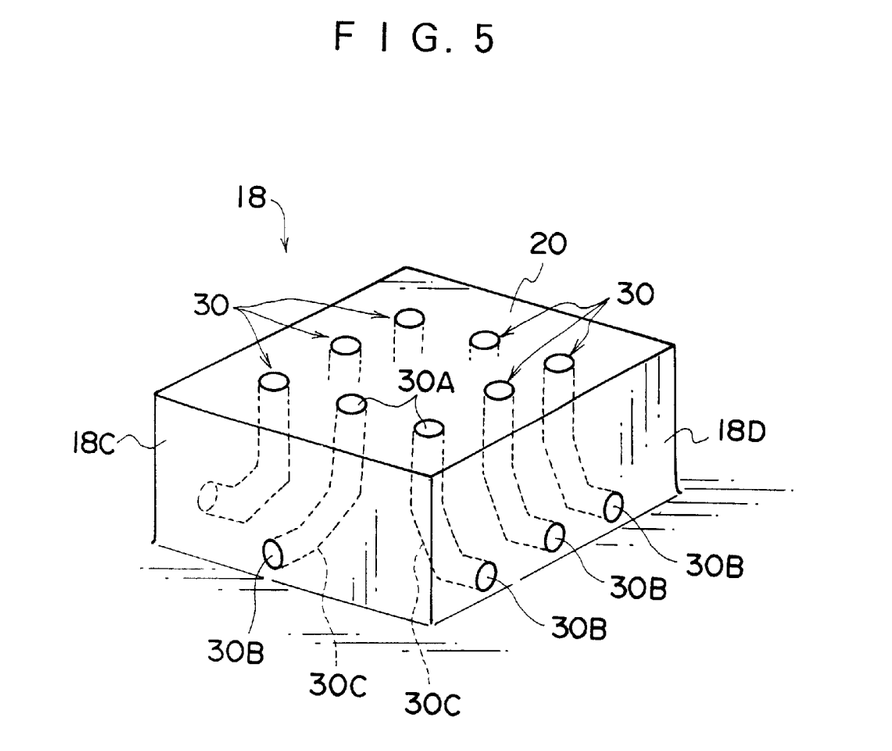
FIG. 5 is a perspective view of a block of a pneumatic tire relating to a second embodiment of the present invention.
Figure 6:
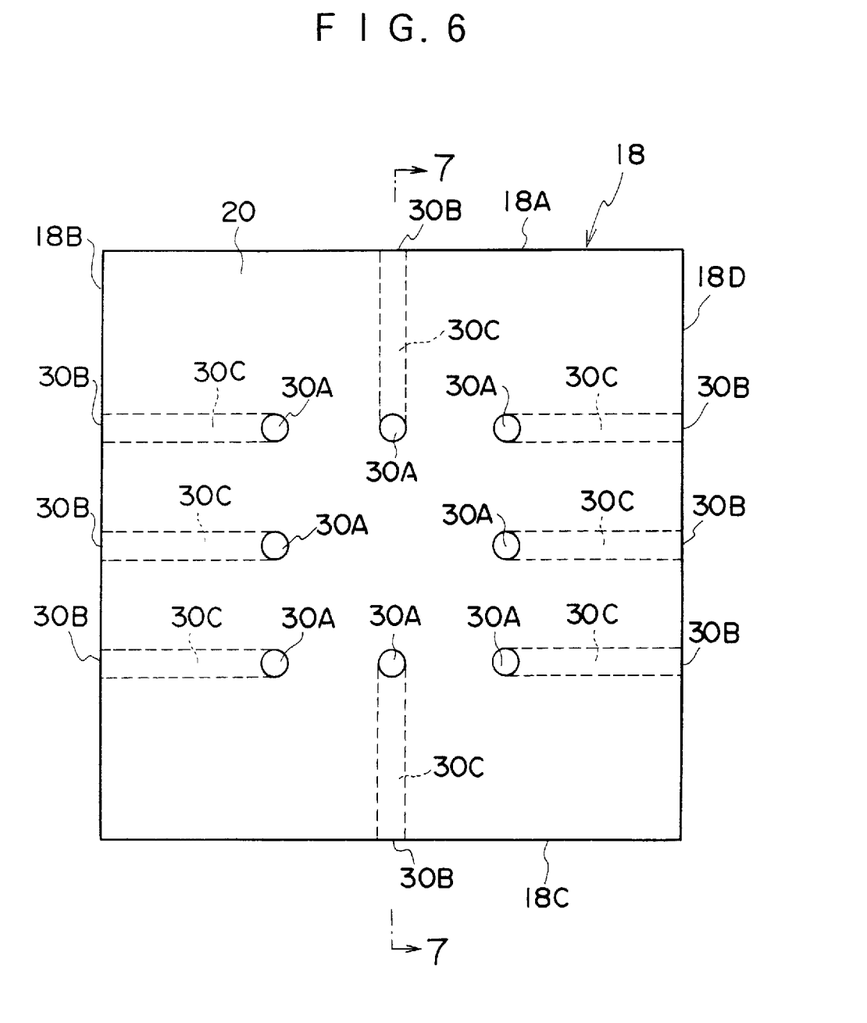
FIG. 6 is a plan view of a block relating to the second embodiment of the present invention.
Figure 7:
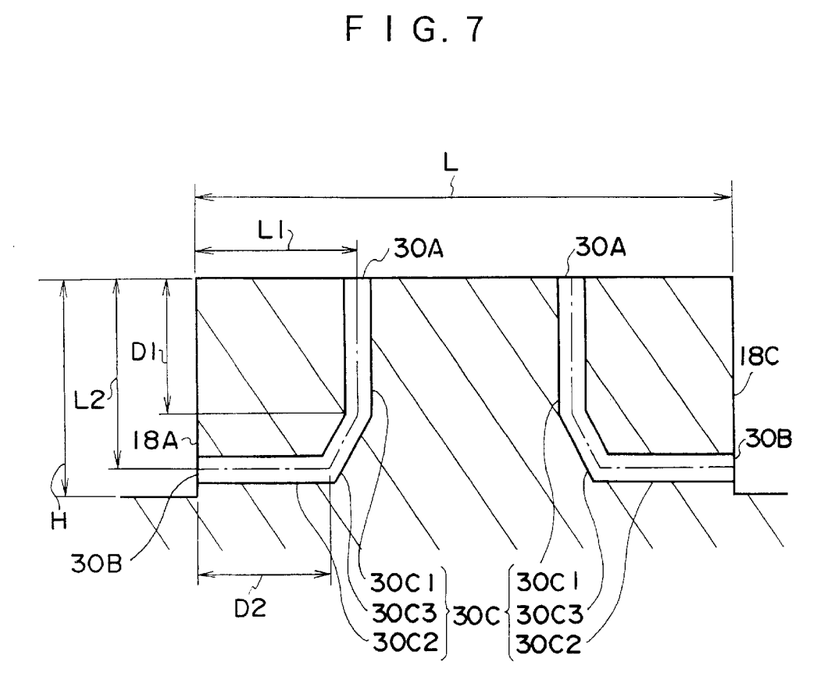
FIG. 7 is a cross-sectional view taken along line 7—7 of FIG. 6.

As illustrated in FIGS. 5 and 6, eight holes 30 having a circular cross-sectional configuration are disposed in a square configuration in the ground contracting surface 20 of the block 18. The hole 30 is formed from an opening 30A which is at the ground contacting surface 20, an opening 30B which is formed at one of side surfaces 18A through 18D, and a (communicating) hole 30C which (communicates) the openings 30A, 30B. As illustrated in FIG. 7, the (communicating) hole 30C is formed from a vertical portion 30C1 which is formed vertically from the opening 30A to the ground contacting surface 20, a parallel portion 30C2 which is formed parallel to the ground contacting surface 20 from the opening 30B, and a bent portion 30C3 which connects the vertical portion 30C1 and the parallel portion 30C2.

When the pneumatic tire 10 having the above-described structure is mounted to a vehicle and the vehicle is driven on a wet road surface, the following effects are obtained.

The water which is taken into the holes 30 from the openings 30A due to the ground contacting surface 20 of the block 18 contacting the ground (or road surface) is discharged via the (communicating) holes 30C and the openings 30B to the main groove 14 or the lug groove 16, so that the drainability of the holes 30 improves. Further, because only eight circular holes 30 are formed in the block 18, the rigidity of the block 18 is sufficiently maintained. As a result, the ground contacting ability of the block 18 improves, and the directional stability on wet road surfaces improves.

In the present embodiment, because the cross-sectional configuration of the hole 30 is circular, it is possible to restrain concentration of stress on the hole during the deformation of the block 18, and thus the generation of cracks in the hole 30 is suppressed.

In the present embodiment, the cross-sectional configuration of the hole 30 is circular. The cross-sectional configuration of the hole may be another shape such as oval.

The properties on wet road surfaces of the pneumatic tire 10 of the present embodiment have been explained above, but the same effects are exhibited on snowy and icy road surfaces.

EXAMPLES

A directional stability test and a braking performance test were carried out in order to confirm the effects of the pneumatic tire according to the above-described embodiments.

Figure 8:
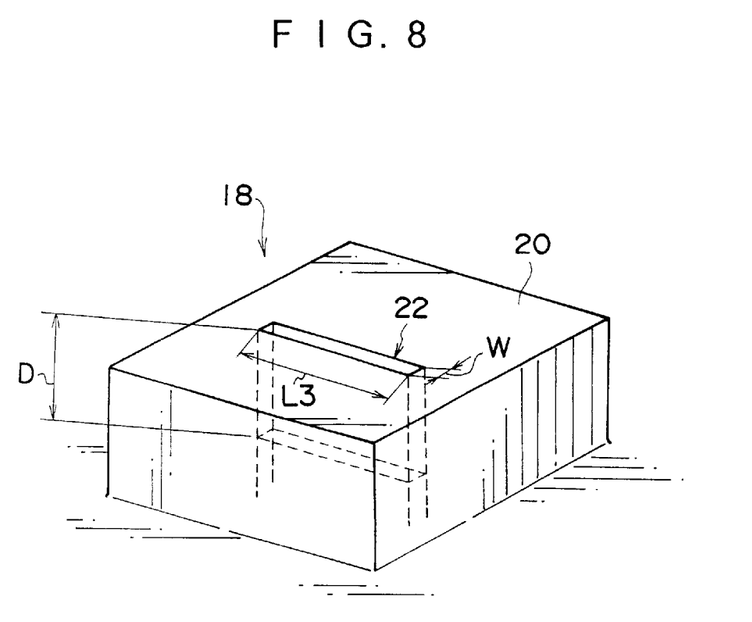
FIG. 8 is a perspective view of a block of a pneumatic tire used in Comparative Example 1.

Comparative Example 1 Tire and Example 1 Tire had, in the blocks of the tread pattern illustrated in FIG. 2, sipes which extended in the tire transverse direction. These blocks were shaped such that the ground contacting surface 20 thereof was a square having a length L of 20 mm, and the height H of the block was 8 mm. Closed sipes which extended in the tire transverse direction and had a length L3 of 10 mm and a width W of 0.6 mm were formed in the blocks. The Comparative Example 1 Tire was formed such that the sipe 22 had a depth D of 6 mm vertically from the ground contacting surface 20, as illustrated in FIG. 8. As illustrated in FIG. 4, the Example 1 Tire was formed such that a distance L1 from side surfaces 18A to the central position of the opening 22A was 10 mm, a depth D1 of the vertical portion 22C1 of the sipe 22 from the ground contacting surface 20 was 4 mm, a distance L2 from the ground contacting surface 20 to the central position of the opening 20B was 7 mm, and a depth D2 of the parallel portion 22C2 of the sipe 22 from side surfaces 18A was 5 mm.

Tests on the directional stability on dry roads, the directional stability on wet roads, and the directional stability on snowy roads were conducted on test courses (having a dry road surface, a wet road surface, and a snowy road surface, respectively), and the directional stability, lane changing stability, and cornering stability were tested. An experienced driver evaluated these respective performances subjectively, and ranked them with 10 being the highest score possible. The comparison value expressed how much the Example 1 Tire improved with respect to the Comparative Example 1 Tire, and these comparison values are listed in Table 1.

TABLE 1

|  | Directional stability on Dry Roads | Directional stability on Wet Roads | Directional stability on Snowy Roads |
| --- | --- | --- | --- |
| Comparison Value | ±0 | 2 | 2 |

It was confirmed that, although the directional stability on dry roads of the Example 1 Tire did not differ from that of Comparative Example 1 Tire, the Example 1 Tire did show an improvement with regard to directional stability on wet roads and directional stability on snowy roads.

An Example 2 tire, in which round holes were formed in the ground contacting surface of each block, and a Comparative Example 2 Tire, in which no such holes were formed, were compared with regard to directional stability on icy roads and braking performance on icy roads.

Comparative Example 2 Tire and Example 2 Tire had, in the blocks of the tread pattern illustrated in FIG. 2, sipes which extended in the tire transverse direction. These blocks were shaped such that the ground-contacting surface 20 thereof was a square having a length L of 20 mm, and the height H of the block was 8 mm. In the Example 2 Tire, eight holes 30 were formed in a square configuration in the ground-contacting surface 20 (see FIGS. 5, 6). As illustrated in FIG. 7, a distance L1 from side surfaces 18A (or 18B or 18C or 18D) to the central position of the opening 30A was 6 mm, a depth D1 of the vertical portion 22C1 of the sipe 22 from the ground contacting surface 20 was 5 mm, a distance L2 from the ground contacting surface 20 to the central position of the opening 30B was 7 mm, and a depth D2 of the parallel portion 30C2 of the hole 30 from side surfaces 18A was 5 mm.

In the on-ice directional stability test, at the test course (on an icy road surface), the directional stability, lane changing stability, and cornering stability were tested. An experienced driver evaluated these respective performances subjectively, and ranked them with 10 being the highest score possible. In the on-ice braking performance test, while the vehicle was traveling on an icy road surface at a speed of 40 km/h, it was measured the distance between the point the brake was fully applied and the point the vehicle was completely stopped. The reciprocal of this distance was used to evaluate the braking performance. The comparison value expressed how much the Example 2 Tire improved with respect to the Comparative Example 2 Tire, and these comparison values are listed in Table 2.

TABLE 2

|  | Directional stability on Icy Roads | Braking Performance on Icy Roads |
| --- | --- | --- |
| Comparison Value | 2 | 40% improvement |

It was confirmed that, by providing holes which extend from the ground-contacting surface of the block to the side surface, the directional stability on icy roads and the braking performance on icy roads markedly improved.

As described above, the present invention provides a pneumatic tire in which, by forming the water drainage passage (the hole) which communicate from the ground contacting surface to a side surface of a block-shaped land portion, water drainability can be improved without adversely affecting block rigidity, and performance on wet roads and on snowy and icy roads improve.

What is claimed is:

1. A pneumatic tire comprising:
    a tread having a plurality of grooves formed therein which intersect one another, thereby defining a plurality of land portions that each have a ground contacting surface and side surfaces; and
    at least one water drainage passage provided in each land portion,
    wherein the water drainage passage is one of a sipe formed within the land portion and a rounded hole formed within the land portion, the water drainage passage having two ends including one end open at said ground contacting surface without opening onto a groove and the other end open at a side surface of the land portion wherein said side surface of the land portion is defined by a transverse groove, the water drainage passage being isolated, and the water drainage passage having a substantially uniform cross section from the one end to the other end.

2. A pneumatic tire according to claim 1, wherein the water drainage passage is the rounded hole.

3. A pneumatic tire according to claim 2, wherein the one end and the other end of the rounded hole are circular.

4. A pneumatic tire according to claim 3, wherein the rounded hole is inclined linearly from the one end towards the other end.

5. A pneumatic tire according to claim 3, wherein the rounded hole has a portion that bends from the one end towards the other end.

6. A pneumatic tire according to claim 5, wherein the rounded hole bends at an obtuse angle at said portion.

7. A pneumatic tire according to claim 1, wherein water drainage passage is the sipe, and the one end and the other end of the sipe are each formed in a thin, elongated configuration.

8. A pneumatic tire according to claim 7, wherein the sipe inclines linearly from the one end towards the other end.

9. A pneumatic tire according to claim 7, wherein the sipe has a portion that bends from the one end towards the other end.

10. A pneumatic tire according to claim 9, wherein the sipe bends at an obtuse angle at said portion.

11. A pneumatic tire comprising:
    a tread having a plurality of intersecting grooves, which thereby define a plurality of block-shape land portions that each have a ground contacting surface and side surfaces; and
    at least one water drainage passage provided in each block-shaped land portion,
    wherein the water drainage passage comprises:
        a first opening end formed within the ground contacting surface of the land portion without opening onto a groove;
        a second opening end formed within a side surface of the land portion, wherein said side surface of the land portion is defined by a transverse groove; and
        a hole connecting the first opening end and the second opening end to one another,
        wherein the water drainage passage is isolated, and wherein the water drainage passage has a substantially uniform cross section from the first opening end to the second opening end.

12. A pneumatic tire according to claim 11, wherein the first opening end, the second opening end, and a cross-sectional configuration of the hole is rounded.

13. A pneumatic tire according to claim 12, wherein the hole has a portion that bends from the first opening towards the second opening.

14. A pneumatic tire according to claim 13, wherein the hole bends at an obtuse angle at said portion.

15. A pneumatic tire according to claim 11, wherein the first opening end, the second opening end, and a cross-section of the hole are each formed in a thin, elongated configuration.

16. A pneumatic tire according to claim 15, wherein the hole has a portion that bends from the first opening towards the second opening.

17. A pneumatic tire according to claim 16, wherein the hole bends at an obtuse angle at said angle.

18. A pneumatic tire comprising:

a tread having a plurality of grooves formed therein which intersect one another, thereby defining a plurality of blocks as land portions that each have a ground contacting surface and side surfaces; and at least one water drainage passage provided in each land portion, wherein the water drainage passage is one of a sipe formed within the land portion and a rounded hole formed within the land portion, the water drainage passage having two ends including one end open at said ground contacting surface without opening onto a groove and the other end open at a side surface of the land portion wherein said side surface of the land portion is defined by a transverse groove, the water drainage passage being isolated and having a substantially uniform cross section from the one end to the other end, and the water drainage passage is bent at an obtuse angle.

19. A pneumatic tire comprising:

a tread having a plurality of intersecting grooves, which thereby define a plurality of block-shape land portions that each have a ground contacting surface and side surfaces; and at least one water drainage passage provided in each block-shaped land portion, wherein the water drainage passage comprises:

a first opening end formed within the ground contacting surface of the land portion without opening onto a groove;

a second opening end formed within a side surface of the land portion, wherein said side surface of the land portion is defined by a transverse groove; and a hole connecting the first opening end and the second opening end to one another, wherein the water drainage passage is isolated, wherein the water drainage passage has a substantially uniform cross section from the first opening end to the second opening end, and wherein the water drainage passage is bent at an obtuse angle.

* * * * *